United States Patent Office 3,525,584
Patented Aug. 25, 1970

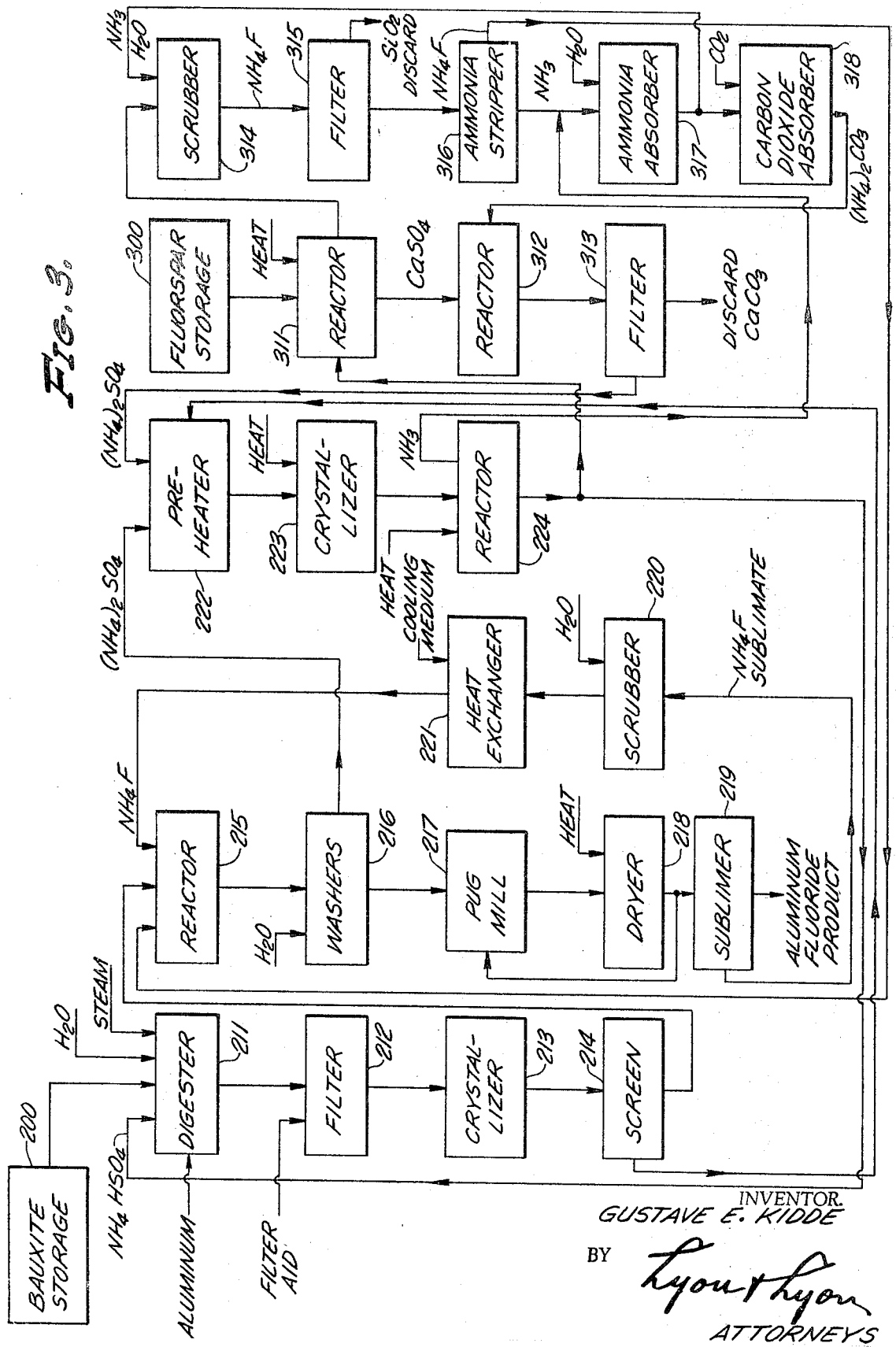

---

3,525,584
PROCESS FOR THE PRODUCTION OF ALUMINUM FLUORIDE
Gustave E. Kidde, 294 California Terrace, Pasadena, Calif. 91105
Continuation-in-part of application Ser. No. 575,205, July 18, 1966, which is a continuation-in-part of applications Ser. No. 328,126, Dec. 4, 1963, and Ser. No. 483,241, Aug. 27, 1965. This application July 3, 1969, Ser. No. 839,096
Int. Cl. C01f 7/50
U.S. Cl. 23—88       17 Claims

ABSTRACT OF THE DISCLOSURE

Aluminum fluoride is produced by the process comprising reacting an ammonium fluoride compound and an aluminum salt to produce an insoluble mixture comprising ammonium fluoroaluminates having the general formula $(NH_4)_xAlF_y$ where $x$ is an integer from 1 to about 3 and $y$ is an integer from 4 to about 6. By maintaining the ratio of fluorine to aluminum at or below 4.6 to 1, $NH_4AlF_4$ is obtained. The ammonium fluoroaluminates are converted to aluminum chloride by dehydrating at a temperature of less than about 300° F. until the moisture content is reduced to a maximum of about 3% by weight and heating the mixture to a temperature of at least about 700° F.

---

This application is a continuation-in-part of my copending application, Ser. No. 575,205, filed July 18, 1966, now abandoned, which was a continuation-in-part of my applications Ser. No. 328,126, filed Dec. 4, 1963, now abandoned and Ser. No. 483,241, filed Aug. 27, 1965, now abandoned.

This invention relates to the production of aluminum fluoride and has particular reference to a process for the production of aluminum fluoride of a quality suitable for use in the production of aluminum metal.

One of the principal objects of the present invention is to provide a novel process for the production of aluminum fluoride.

Another object of the present invention is to provide a process for the production of high quality aluminum fluoride and hydrogen fluoride utilizing waste products and/or low grade ores as raw materials.

A further object is to provide a novel monoammonium-fluoroaluminate and method for its production.

Increasing use of aluminum fluoride as a replacement for or supplement to the cryolite used in the production of aluminum metal has created a large demand for the fluoride compound. However, present methods for the production of aluminum fluoride are such that the cost of the product is relatively high. An important object of the present invention is, therefore, to provide a process for the production of aluminum fluoride of a quality suitable for use in the production of aluminum, yet at costs considerably lower than those heretofore possible.

Other objects and advantages of this invention, it is believed, will be readily apparent from the following detailed description of preferred embodiments thereof when read in connection with the accompanying drawings.

Figure 1:
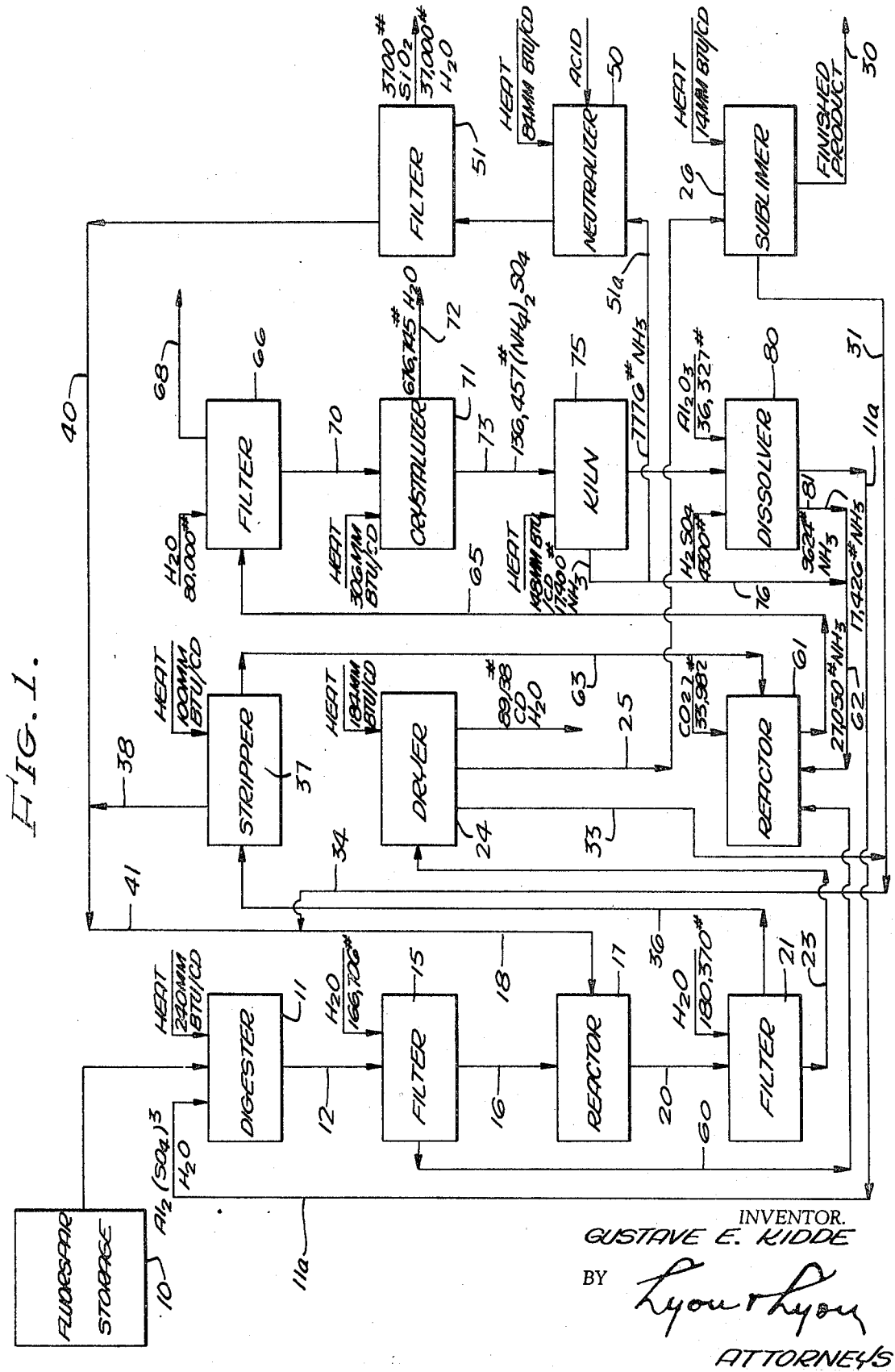
Figure 2:
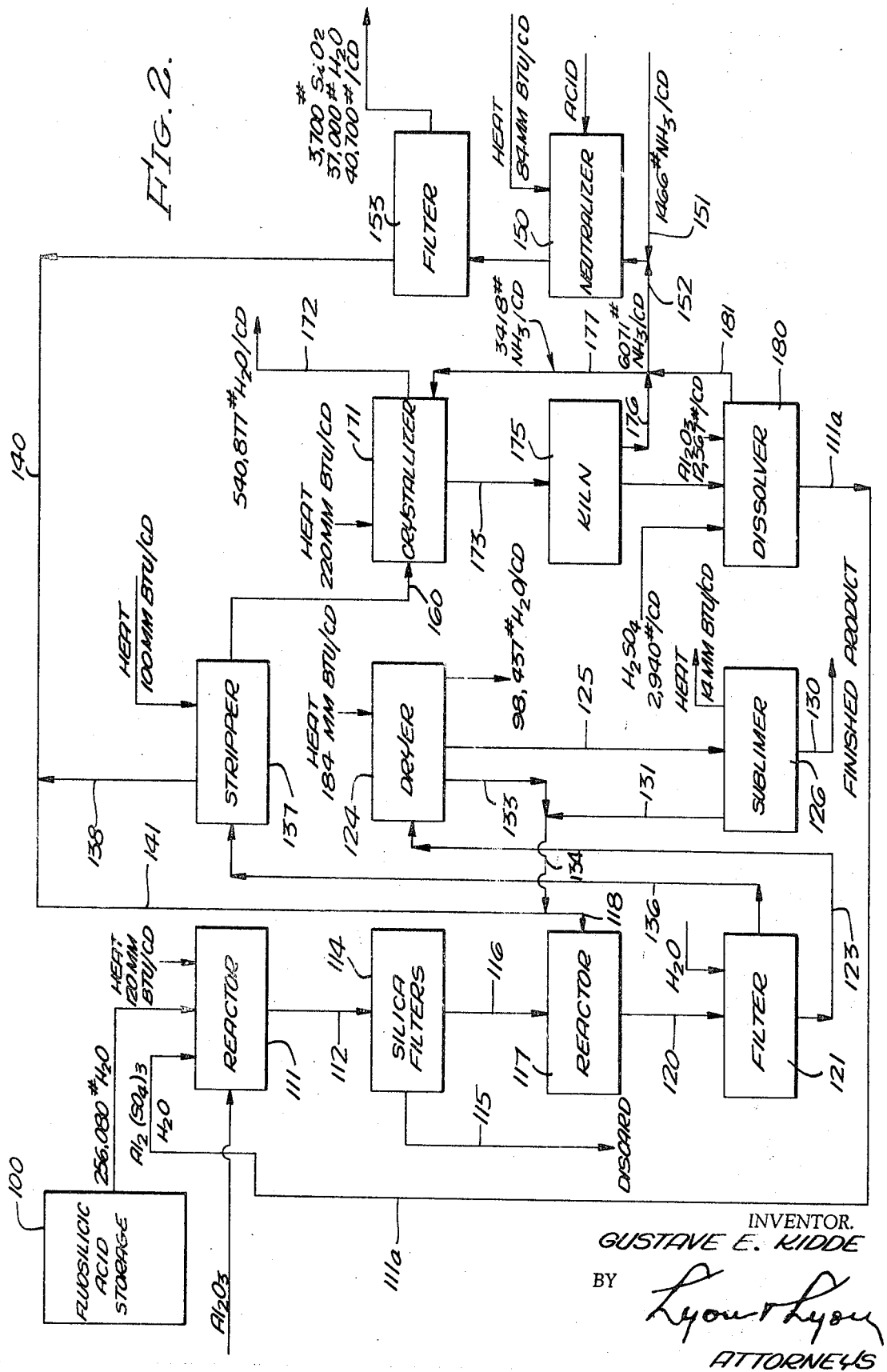

In the drawings:
FIG. 1 is a flow sheet illustrating one embodiment of the present invention.
FIG. 2 is a flow sheet illustrating a modified form of the process of the invention.
FIG. 3 is a flow sheet illustrating a modified form of the process of the invention.

Briefly, this invention comprehends within its scope the discovery that the reaction between ammonium fluoride or ammonium bi-fluoride and aluminum fluosulfate, aluminum sulfate, ammonium aluminum sulfate or aluminum fluohydroxide and other aluminum salts can be used in a process in which the end product is aluminum fluoride. The aluminum fluosulfate is readily and economically produced from low grade fluorspar, as disclosed in the copending application Ser. No. 599,565, filed July 23, 1956 for Gustave E. Kidde, on "Process for the Extraction of Fluorine and Other Values from Low Grade Fluorspars," or from waste silicofluoride compounds, as disclosed in my U.S. Pat. 2,981,601, issued Apr. 25, 1961, "Process for the Treatment of Silicofluoride Compounds" and U.S. Pat. No. 3,039,974, issued June 19, 1962, on "Process for the Production of Silica Gel and Cracking Catalysts."

The derivation of aluminum fluosulfate from fluorspar proceeds according to the general equation:

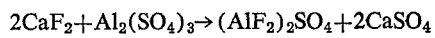
$$2CaF_2 + Al_2(SO_4)_3 \rightarrow (AlF_2)_2SO_4 + 2CaSO_4$$

The production of aluminum fluosulfate solutions from waste silicofluoride compounds such as those containing fluosilicic acid is as follows:

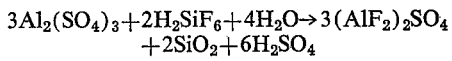
$$3Al_2(SO_4)_3 + 2H_2SiF_6 + 4H_2O \rightarrow 3(AlF_2)_2SO_4 + 2SiO_2 + 6H_2SO_4$$

This reaction could be modified by the addition of alumina to give:

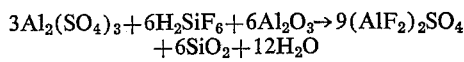
$$3Al_2(SO_4)_3 + 6H_2SiF_6 + 6Al_2O_3 \rightarrow 9(AlF_2)_2SO_4 + 6SiO_2 + 12H_2O$$

All of the above reactions proceed quantitatively to produce silica-free solutions of aluminum fluosulfate.

There reactions accomplish two-thirds of the conversion of the aluminum to aluminum fluoride, without necessitating the use of expensive hydrofluoric acid. In accordance with the present invention the addition of the third atom of fluorine is accomplished by the reaction of ammonium fluoride or ammonium bifluoride in solid form or in solution, either directly with the aluminum fluosulfate or with aluminum fluohydroxide.

When aluminum fluosulfate is used, the reactions which were theoretically contemplated were as follows:

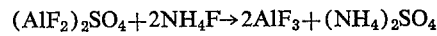
$$(AlF_2)_2SO_4 + 2NH_4F \rightarrow 2AlF_3 + (NH_4)_2SO_4$$

$$(AlF_2)SO_4 + NH_4F \cdot HF \rightarrow 2AlF_3 + \tfrac{1}{2}(NH_4)_2SO_4 + \tfrac{1}{2}H_2SO_4$$

However, the actual reactions are believed to be:

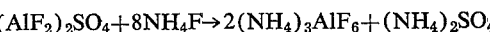
$$(AlF_2)_2SO_4 + 8NH_4F \rightarrow 2(NH_4)_3AlF_6 + (NH_4)_2SO_4$$

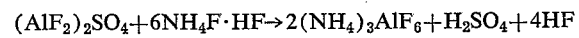
$$(AlF_2)_2SO_4 + 6NH_4F \cdot HF \rightarrow 2(NH_4)_3AlF_6 + H_2SO_4 + 4HF$$

and

$$(AlF_2)_2SO_4 + 2NH_4F \cdot HF \rightarrow 2NH_4AlF_4 + H_2SO_4$$

and, perhaps,

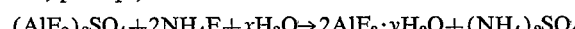
$$(AlF_2)_2SO_4 + 2NH_4F + xH_2O \rightarrow 2AlF_3 \cdot yH_2O + (NH_4)_2SO_4$$

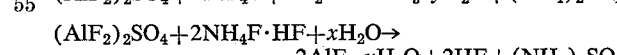
$$(AlF_2)_2SO_4 + 2NH_4F \cdot HF + xH_2O \rightarrow 2AlF_3 \cdot yH_2O + 2HF + (NH_4)_2SO_4$$

When aluminum fluohydroxide is used, the aluminum fluosulfate is converted to the aluminum fluohydroxide with ammonia and this product is reacted with ammonium fluoride or ammonium bifluoride which reactions were contemplated as theoretically proceeding according to the equations:

$$AlF_2OH + NH_4F \rightarrow AlF_3 + NH_3\uparrow + H_2O$$

$$2AlF_2OH + NH_4F \cdot HF \rightarrow 2AlF_3 + NH_3\uparrow + H_2O$$

However, the actual reactions are believed to be:

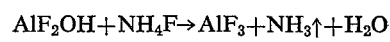
$$AlF_2OH + NH_4F \rightarrow (NH_4)_3AlF_6 + NH_3\uparrow + H_2O$$

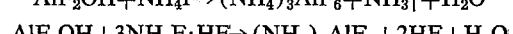
$$AlF_2OH + 3NH_4F \cdot HF \rightarrow (NH_4)_3AlF_6 + 2HF + H_2O$$

It would appear that the products of these reactions may also comprise fluoroaluminates other than $$(NH_4)_3AlF_6$$

such as $(NH_4)AlF_4$ and $(NH_4)_2AlF_5$. The product may also comprise a small amount, e.g., about 5 or 10%, of aluminum fluoride. In any event, this fluoroaluminate product is then dehydrated at temperatures below about 300° F. at atmospheric pressure, preferably below about 250° F., until the composition has an extremely low water content. As a practical matter, about 3% water is the maximum amount which may be tolerated for commercial operations. Preferably, the water content is reduced to less than about 1%. This dehydrated product may then be sublimed at a temperature in the range of from about 500° F. to about 1200° F., preferably at a temperature in the range of from about 700° F. to about 950° F., to produce aluminum fluoride. The reactions may be:

$$(NH_4)_3AlF_6 + heat \rightarrow AlF_3 + 3NH_4F$$

or they may proceed step-wise according to:

$$(NH_4)_3AlF_6 + heat \rightarrow (NH_4)_2AlF_5 + NH_4F$$
$$(NH_4)_2AlF_5 + heat \rightarrow NH_4AlF_4 + NH_4F$$
$$(NH_4)AlF_4 + heat \rightarrow AlF_3 + NH_4F$$

The dehydration step is extremely important because it has been found that the presence of a substantial amount of water during the sublimation procedure has a most detrimental affect on the yield of aluminum fluoride product. The function of the water in decreasing yield is believed to involve hydrolysis between the water and the aluminum fluoride which is produced by sublimation. Possible reactions might be:

$$2AlF_3 \cdot H_2O + H_2O \rightarrow Al_2O_3 + 6HF \text{ or}$$
$$2AlF_3 + 3H_2O \rightarrow Al_2O_3 + 6HF$$

When using ammonium bi-fluoride, these reactions require an excess of this reactant over the demanded stoichiometrically. When using ammonium fluoride, a stoichiometric excess is not required or preferred to complete the reaction.

Ammonium bi-fluoride or ammonium fluoride can be obtained economically by the neutralization of fluosilicic acid, by the reaction of fluorspar and ammonium sulfate, by reaction of aluminum fluosulfate and ammonium sulfate, by the reaction of fluorspar with ammonium bisulfate and the neutralization of the hydrogen fluoride evolved with ammonia or by the reaction of fluorspar and sulfuric acid with the neutralization of the hydrogen fluoride with ammonia. If low grade fluorspar or fluosilicic acid are used, the ammonia neutralization must be carried out to give a solution having a pH of about 8.8 in order to eliminate all silica from the ammonium fluoride solution. However, depending upon the amount of silica which may be desired or tolerated, this solution may have a pH of from about 5.5 to about 8.8. Thus, the present process permits the use of very low-cost raw materials and is well adapted for economical production of the desired aluminum fluoride.

The present invention also includes within its scope the reaction of aluminum sulfate, ammonium alum, aluminum nitrate, aluminum chloride, or other aluminum salts which do not contain fluorine with ammonium fluoride or bifluoride. In this embodiment of the present invention, the use of aluminum sulfate or ammonium alum is preferred because these salts permit regeneration of the acidic medium used in the process from the by-products of the process. Once again, these reactions function to produce a product which comprises at least one ammonium fluoroaluminate and probably a mixture of aluminum fluoroaluminates. This product may also contain a small amount, e.g., 5 or 10%, of aluminum fluoride. Thus, it is necessary to dehydrate and sublime the fluoroaluminate product in the manner previously described. These aluminum salts may be prepared from any alumina bearing ores such as bauxite. For example, bauxite or some other alumina bearing ore may be reacted with ammonium bisulfate to form ammonium alum.

When the fluoroaluminate product of the present invention is sublimed, it is quite possible that the $(NH_4)_3AlF_6$ in this product is sublimed to other fluoroaluminates before aluminum fluoride is formed. For example, the fluoroaluminates $(NH_4)_2AlF_5$ and $(NH_4)AlF_4$ could be formed successively before the final product $AlF_3$ is formed. The volatiles separated during sublimation primarily comprise ammonium fluoride, but some of this may be decomposed into HF and free ammonia due to the elevated temperature of the sublimer.

It has also been found that the pH of the resulting solution or filtrate obtained from the reaction between the aluminum salt and ammonium fluoride has a substantial effect on the yield of aluminum fluoride. This pH, corrected to 60° F. should be maintained in the range of from about 3 to about 5.5. In addition, it has been found that yields may be increased by maintaining the reaction temperature as low as possible, the lower limit being established by that temperature at which the reaction mixture becomes so viscous that it becomes unmanageable. In this regard, it has been found that temperatures as low as 30° F. and lower may be used. However, substantially higher temperatures may be used even though there will be somewhat of a decrease in the percentage yields when this is done. For example, temperatures as high as 138° F. have been successfully used in this process.

It would appear that the aluminum to fluorine ratio in the reaction between ammonium fluoride and the aluminum salts of this embodiment of the invention does not have a substantial effect on the yield of the triammoniumfluoroaluminate when operating in accordance with their disclosure. Thus, in general, stoichiometric amounts of the reactants may be preferred, although an excess of either reactant moy be used.

However, I have found that the aluminum to fluorine atomic ratio does have an important effect upon the particular fluoroaluminate salt that is formed. Furthermore, I have discovered that a novel fluoroaluminate, monoammoniumfluoroaluminate, $NH_4AlF_4$, can be formed by maintaining the fluorine to aluminum atomic ratio at or below about 4.6:1. At or below 4.6:1, it is possible to obtain a product containing 90% or more $NH_3AlF_4$. However, when the ratio exceeds the upper limit of about 4.6, e.g., 4.63, the product obtained contains only about 25% of the monoammonium salt and about 75% of the triammonium salt. Furthermore, by operating at a ratio of greater than 6:1, a product containing primarily triammonium salt is obtained.

In order to obtain a substantial yield of the monoammonium salt, it is necessary to have a fluorine to aluminum atomic ratio of at least about 4.5:1. Below a ratio of about 4.5:1, the product produced may still contain a high percentage of $NH_4AlF_4$ but the yield of the product is lower. Thus, it has been found that the monoammonium salt can be produced in high yields only by operating in the narrow region of fluorine to aluminum ratios of about 4.5:1 to about 4.6:1. However, this merely represents a preferred operating range as the $NH_4AlF_4$ salt can be produced, although in smaller yields, by operating outside of this range. As in the case with the triammonium salt, the monoammonium salt may be formed by the reaction of ammonium fluoride or ammonium bifluoride with aluminum fluosulfate, aluminum sulfate, ammonium aluminum sulfate, aluminum fluohydroxide, aluminum nitrate, aluminum chloride, or other aluminum salts which do not contain fluorine.

The following specific examples are illustrative of the process of the present invention, but it is to be understood that the invention is not to be limited to the details thereof:

EXAMPLE 1

2,000 grams of aluminum fluosulfate solution prepared in accordance with the method disclosed in said applicatiin Ser. No. 599,565, and containing 8.06 percent F were mixed with 1500 ml. $H_2O$ and heated to 170° F. and then 400 grams $NH_4F \cdot HF$ were added and the whole reacted for 15 minutes. A dense and readily-filterable precipitate resulted which weighed 885 grams wet and 610 grams when dried at 250° F. The 250° F. material contained 12.4 percent $NH_3$ and 56.62 percent F. The combined filtrate weighed 3398 grams and contained 0.65 percent $NH_3$; 2.01 percent F; 0.36 percent $Al_2O_3$; and had 9.7 percent free acid calculated as $H_2SO_4$. The wash water weighed 3010 grams and contained 0.25 percent $NH_3$, 0.10 percent F and 0.9 percent free acid as $H_2SO_4$. A fluorine balance at this point was:

| Fluorine In | Grams | Fluorine Out | Grams |
| --- | --- | --- | --- |
| Solution | 161.2 | Product | 346.0 |
| Bifluoride | 266.0 | Filtrate | 68.4 |
|  |  | Wash | 3.0 |
| Total | 427.2 |  | 418.4 |

Fluorine accounted for =98.0%.

The product was heated slowly to 500° F. and then to 900° F. and the sublimate condensed. The product weighed 418.0 grams and contained 60.57 percent F. The sublimate weighed 162.4 grams and contained 50.1 percent F.

Fluorine in—346.0 grams
Fluorine in product—254.0 grams
Fluorine in sublimate—81.0 grams
Percent fluorine accounted for—97.0

The ammonia balance shows 93.3 percent $NH_3$ recovered in filtrates and sublimates.

The reactions here indicate that the fluosulfate is converted to a mixture of ammonium fluoroaluminates.

The fluorine recovery is centered about the filtrates and wash liquors. Since these are strongly acidic, the residual fluorine should be removable by boiling and recovery in the same scrubber as is used for reclaiming the sublimate. The filtrate from the reaction was boiled for two hours and its fluorine content reduced fro 2.01 percent to 0.47 percent with a total volume reduction of 53 percent.

The above data allow the following reaction to be contemplated:

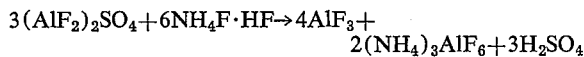

but the actual reaction is believed to be:

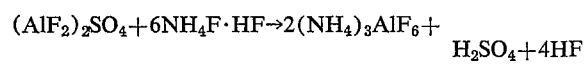

However, the reaction requires an excess of ammonium bifluoride since when tried stoichiometrically, it yields but 70 percent of theoretical. From 50–75 percent excess, based on the amount of fluorine in the fluosulfate is adequate.

EXAMPLE 2

600 gram of an aqueous solution containing 2.21 percent F as $(AlF_2)_2SO_4$ were neutralized to a pH of 5.1 with 44.0 grams 28 percent $NH_3$. The solids were separated and washed and found to weigh 102.4 grams and to contain 12.08 percent F. The combined filtrate and wash liquors weighed 958 grams and contained 0.11 percent F. There were 13.2 grams F in the base solution and the products had 12.4 grams F in the filter cake and 1.04 grams F in the filtrate for a total of 13.4 grams fluorine. 15 grams $NH_4F \cdot HF$ and 25 grams $H_2O$ were added to the wet cake and the mixture was heated to 250° F. and kept at this temperature until no more ammonia was given off. The paste weighed 47.5 grams and contained 45.79 percent F and 5.5 percent $NH_3$. Fluorine input to this reaction was 22.1 grams and the fluorine accounted for equals 21.8 grams. The paste was then heated to 500° F. and then slowly to 900° F. The final product weighed 31.9 grams and contained 59.67 percent F. The overall fluorine balance shows 22.9 grams F input; 19.0 grams in product, 2.9 in sublimate, and 1.0 grams in filtrate, or an accounting of 100 percent.

EXAMPLE 3

1660 grams of aluminum fluosulfate liquor containing 2.21 percent F were neutralized to 5.2 pH with 117.5 grams 28 percent $NH_3$. Then 50 grams $NH_4F \cdot HF$ were added and the mass heated to boiling and heat continued until all $NH_3$ evolution had ceased. The slurry was then filtered and washed. The wet cake weighed 300.0 grams and had 3.0 percent $NH_3$ and 21.9 percent F. Thus, the total fluorine input is 70.0 grams and of this, 69.8 grams have been accounted for. The cake was heated to 250° F. and found to weight 139.4 grams, analyzing 47.02 percent F or 65.6 grams F. The dried product was heated to 550° F. and found to weight 100 grams and contain 54.71 percent F. After heating slowly to 900° F. the product weighed 86.0 grams and had a fluorine content of 59.37 percent. The fluorine accounted for is 51.5 grams in the product and 13.3 grams in the sublimate for a total of 64.8 grams out of 65.5 or 98.6 percent.

EXAMPLE 4

1660 grams of 2.21 percent aluminum fluosulfate solution were neutralized with 117.5 grams 28 percent $NH_3$ to a pH of 5.2 and then 50.0 grams of $NH_4F \cdot HF$ were added. The whole was then heated until a paste had been formed and then the paste was heated at 250° F. for two hours, after which it was slurried in water and the solids filtered and washed. The cake was dried at 550° F. and then at 900° F.

|  | Grams | Percent F. |
| --- | --- | --- |
| Weight wet cake | 140.0 | 45.00 |
| Weight 550° cake | 94.0 | 57.14 |
| Weight 900° cake | 76.0 | 62.06 |
| Weight filtrates | 1541.0 | 0.29 |

Total fluorine in amounted to 70.0 grams. Of the 47.3 grams in the product, 4.5 grams were in the filtrate and 15.1 grams were captured as sublimates for a total of 66.9 grams or 95.7 percent.

EXAMPLE 5

280 grams of $Al_2(SO_3)_4 \cdot 13H_2O$ were dissolved in 600 ml. $H_2O$ and 100 grams of $Al_2O_3$ as freshly precipitated hydrate were added. The whole was brought to 200° F. and then 140.0 grams $H_2SiF_6$ in a 30.8 percent solution were added. The whole was reacted under reflux for four hours. Then the precipitate was filtered off, washed, ignited and weighed. The weight was 62.7 grams. The filtrate and wash liquor (aluminum fluorosulfate solution) weighed 2742 grams and contained 5.18 percent F and showed no $SiO_2$. The liquor was concentrated and then 250 grams $NH_4F \cdot HF$ were added. The precipitate was filtered, dried, and then carefully heated to 900° F. The end product weighed 262.0 grams and contained 60.62 percent F. The combined filtrates weighed 3663 grams and contained 0.18 percent F. The sublimate weighed 140.8 grams and contained 51.3 percent F.

| Fluorine In |  | Fluorine Out |  |
| --- | --- | --- | --- |
| Acid | 140.0 | End Product | 165.2 |
| Bifluoride | 166.5 | Filtrate | 65.9 |
|  |  | Sublimate | 72.0 |
| Total | 306.5 | Total | 303.1 |

The following example illustrates the production of hydrogen fluoride from the mixture of ammonium fluoroaluminates produced by the reaction between ammonium bifluoride and aluminum fluorosulfate or aluminum fluorohydroxide:

EXAMPLE 6

100 grams of a mixture of aluminum ammonium fluoroaluminates containing 56.62 percent F; 12.4 percent $NH_3$ and 19.3 percent Al were added to 350.0 grams of molten ammonium bi-sulfate at 435° F. There was an immediate evolution of HF which was condensed and the reaction was carried out for thirty minutes. At the end of that time the HF was determined in the condensate and found to be 30.87 grams as fluorine. This is equivalent to an evolution of 56.6% of the fluorine contained in the original sample of ammonium fluoroaluminate.

In a number of experiments a satisfactory product, obtained by sublimation of the mixture of ammonium fluoroaluminates at 500° F., fell below the minimum fluorine requirements of 58 percent F when heated to 900° F. In studying these results, it was noticed that all had more than 20 percent volatile matter at 500° F. and also that all showed acidic vapor when at or about 900° F. It is postuated that there is hydrolysis between the combined water and the $AlF_3$ produced by the decomposition of the fluoroaluminates and that this accounts for the losses in fluorine content. A possible reaction might be:

$$2AlF_3 \cdot H_2O \rightarrow Al_2O_3 + 6HF\uparrow \text{ or}$$
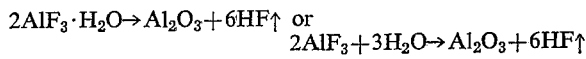
$$2AlF_3 + 3H_2O \rightarrow Al_2O_3 + 6HF\uparrow$$

This is because there was little or no loss of F when volatile matter was below 18 percent, which corresponds to $AlF_3 \cdot H_2O$, but when additional moisture was present, there was considerable hydrolysis.

Because of this possibility of decomposition the temperature of the sublimation step should be carefully controlled so as not to exceed 1200° F. In commercial operation of the process, a temperature of between about 700 and about 950° F. is preferred.

EXAMPLE 7

Referring now to the drawings, FIG. 1 illustrates an embodiment of the process of this invention, representing a further specific example thereof as applied to a continuously-operated commercial plant designed for the daily production of 10 tons of aluminum fluoride. No attempt has been made in the drawing to illustrate any specific details of the apparatus, as each piece of apparatus is well known in the art and may be obtained and readily operated by any person skilled in the art after having read this specification.

As indicated in the drawing, low-grade fluorspar ore, having been dried and crushed, is stored at 10 and is fed to the digester 11 at the rate of 58,327 pounds of calcium fluoride per day, along with 566,978 pounds per day of an aqueous solution containing 121,804 pounds per day of aluminum sulfate (line 11a). The digester solution is heated to about 212° F., the products being primarily insoluble calcium sulfate and soluble aluminum fluorosulfate. The material fed from the digester through line 12 comprises the following:

| | Pounds per day |
|---|---|
| F | 27,069 |
| $SO_4$ | 34,202 |
| Al | 19,232 |
| $CaF_2$ | 1,387 |
| $CaSO_4$ | 96,860 |
| CaO | 2,070 |
| $H_2O$ | 444,425 |

The product from the digester are filtered and washed on the filter 15, 166,706 pounds per day of wash water being used. The hot filtrate (about 170° F.), comprising a solution of aluminum fluosulfate, and having the following analysis:

| | Pounds per day |
|---|---|
| F | 25,990 |
| $SO_4$ | 32,836 |
| Al | 18,467 |
| CaO | 2,070 |
| $H_2O$ | 535,260 | is fed through the line 16 to the reactor 17 wherein it is reacted with ammonium bifluoride solution fed through the line 18 and consisting of the following:

| | Pounds per day |
|---|---|
| $NH_4$ | 20,292 |
| F | 42,906 |
| H | 1,128 |
| $H_2O$ | 64,296 |

The reaction product, consisting of:

| | Pounds per day |
|---|---|
| F | 68,896 |
| $NH_4$ | 20,292 |
| $SO_4$ | 32,836 |
| Al | 18,467 |
| CaO | 2,070 |
| H | 1,128 |
| $H_2O$ | 520,163 | is fed through the line 20 to a filter 21 wherein it is filtered and washed with 180,370 pounds of water per day. The filter cake comprises:

| | Pounds per day |
|---|---|
| F | 50,005 |
| $NH_4$ | 11,847 |
| Al | 17,613 |
| CaO | 608 |
| $H_2O$ | 111,570 | and is fed through the line 23 to the drier 24 wherein it is dried to a product temperature of about 300° F. and an analysis of:

| | Pounds per day |
|---|---|
| F | 50,005 |
| $NH_4$ | 11,847 |
| Al | 17,613 |
| CaO | 608 |
| $H_2O$ | 3,834 |

This product is fed through the line 25 to the sublimer 26 wherein it is sublimed at a temperature of 900–950° F. The finished product is removed from the sublimer through the line 30 and amounts of 51,000 pounds per day analyzing as follows:

| | Percent by weight |
|---|---|
| F | 61.1 |
| Al | 28.9 |
| $Al_2O_3$ | 5.9 |
| CaO | 1.1 |
| $H_2O$ | 0.3 |

The ammonium bifluoride solution in line 18 is produced as follows:

(a) The sublimate from the sublimer contains 12,450 pounds of fluorine, 11,200 pounds of ammonia and 3,800 pounds of water. The ammonia is combined with the fluorine as ammonium fluoride, but some of this may be decomposed into HF and free ammonia due to the elevated temperature of the sublimer. This sublimate is fed through the line 31 and is combined with the volatiles from the drier 24, these volatiles being taken off through the line 33 and comprising 4,776 pounds per day of F, 4,523 pounds per day of $NH_4$ and 9,299 pounds per day of $H_2O$. These combined materials are fed through the line 34 to the line 18.

(b) The filtrate from the filter 21 comprises:

| | Pounds per day |
|---|---|
| F | 18,891 |
| $NH_4$ | 8,445 |
| $SO_4$ | 32,836 |
| Al | 854 |
| CaO | 1,462 |
| H | 1,128 |
| $H_2O$ | 588,963 | and is fed through the line 36 to a stripper 37 wherein it is boiled to remove the fluorine values, these volatiles being taken off through the line 38 and comprising 20,608 pounds per day of HF and 48,086 pounds per day of $H_2O$. This material is combined with the material in the line 40 (described below) and fed through the line 41 to the line 18.

(c) Make-up ammonium bifluoride is produced by neutralizing fluosilicic acid (8,813 pounds per day of $H_2SiF_6$ and 54,017 pounds per day of $H_2O$), which is fed to a neutralizer 50, with ammonia (7,776 pounds per day of $NH_3$) from the line 51a. The reaction product is filtered on a filter 51 to separate therefrom 3,700 pounds per day of $SiO_2$ and 37,000 pounds per day of $H_2O$. The filtrate in line 40 comprises 6,977 pounds per day of F, 8,424 pounds per day of $NH_4$ and 16,208 pounds per day of $H_2O$.

The aluminum sulfate fed into the digester 11 through the line 11a is produced as follows:

The gypsum filter cake from the filter 15, comprising:

| | Pounds per day |
|---|---|
| $CaSO_4$ | 96,860 |
| $CaF_2$ | 1,387 |
| $SO_4$ | 1,366 |
| $H_2O$ | 145,294 |
| Al | 765 |
| F | 1,079 | is fed through the line 60 to a reactor 61 wherein it is reacted, at room temperature, with the solution from the stripper 37 and with 27,050 pounds per day of $NH_3$ from line 62 and 33,982 pounds per day of $CO_2$, to produce ammonium sulfate. The solution fed from the stripper to the reactor 61 through the line 63 comprises:

| | Pounds per day |
|---|---|
| $NH_4$ | 8,445 |
| $SO_4$ | 32,836 |
| Al | 854 |
| CaO | 1,462 |
| $H_2O$ | 540,877 |

The reaction product, 892,257 pounds per day, is fed through the line 65 to a filter 66 wherein it is washed with 80,000 pounds per day of $H_2O$. The cake, comprising:

| | Pounds per day |
|---|---|
| $CaCO_3$ | 70,892 |
| $CaF_2$ | 1,387 |
| $Al_2O_3$ | 1,450 |
| F | 1,079 |
| $H_2O$ | 80,000 |
| CaO | 1,462 | is discarded through line 68.

The filtrate from the filter 66, comprising 139,242 pounds per day of $(NH_4)_2SO_4$ and 676,745 pounds per day of $H_2O$ is fed through the line 70 to a crystallizer 71 wherein the ammonium sulfate is crystallized with the removal through line 72 of 676,745 pounds per day of water. The ammonium sulfate is sent through line 73 to a kiln 75 where it is heated to about 550° F., 17,400 pounds per day of $NH_3$ being driven off through line 76 and a portion sent to line 62, the remainder being sent through line 51a to the neutralizer as previously described. The product from the kiln 75 (117,883 pounds per day of $NH_4HSO_4$) is dissolved in dissolver 80 with 4300 pounds per day of $H_2SO_4$ and 36,372 pounds per day of $Al_2O_3$ to produce the desired aluminum sulfate ($Al_2(SO_4)_3$) which is fed through line 11a. Line 81 feeds 17,426 pounds per day of $NH_3$ from the dissolver 80 to line 62.

EXAMPLE 8

The modified process illustrated in FIG. 2 is generally similar to that of Example 7 but utilizes waste fluosilicic acid in place of fluorspar as a basic raw material.

As indicated in FIG. 2, dilute fluosilicic acid is stored at 100 and is fed to the reactor 111 at the rate of 34,920 pounds of $H_2SiF_6$ and 256,080 pounds of water per day, together with 207,340 pounds per day of an aqueous solution containing 41,468 pounds per day of aluminum sulfate, and with 24,735 pounds per day of alumina. The digester mixture is heated to about 212° F., preferably by submerged combustion heating, the products being primarily insoluble silica and soluble aluminum fluosulfate. The material fed from the digester through the line 112 comprises the following:

| | Pounds per day |
|---|---|
| F | 27,069 |
| $SO_4$ | 34,202 |
| Al | 19,232 |
| $SiO_2$ | 14,956 |
| $H_2O$ | 427,616 |

These products are filtered and washed on the filter 114, 188,493 pounds per day of wash water being used. The insolubles removed by the filters comprise:

| | Pounds per day |
|---|---|
| $SiO_2$ | 14,956 |
| $SO_4$ | 1,366 |
| $H_2O$ | 170,150 |
| Al | 765 |
| F | 1,079 | and are removed to discard through the line 115. The hot filtrate (about 170° F.), comprising a solution of aluminum fluosulfate, and having the following analysis:

| | Pounds per day |
|---|---|
| F | 25,990 |
| $SO_4$ | 32,836 |
| Al | 18,467 |
| $H_2O$ | 445,959 | is fed through the line 116 to the reactor 117 wherein it is reacted with ammonium bifluoride solution fed through the line 118 and consisting of the following:

| | Pounds per day |
|---|---|
| $NH_4$ | 20,292 |
| F | 42,906 |
| H | 1,156 |
| $H_2O$ | 74,204 |

The reaction product, consisting of:

| | Pounds per day |
|---|---|
| F | 68,896 |
| $NH_4$ | 20,292 |
| $SO_4$ | 32,836 |
| Al | 18,467 |
| H | 1,156 |
| $H_2O$ | 520,163 | is fed through the line 120 to a filter 121 wherein it is filtered and washed with 180,370 pounds per day of water. The filter cake comprises:

| | Pounds per day |
|---|---|
| F | 50,005 |
| $NH_4$ | 11,847 |
| Al | 17,613 |
| $H_2O$ | 111,570 | and is fed through the line 123 to the drier 124 wherein it is dried to a product temperature of about 300° F. and an analysis of:

| | Pounds per day |
|---|---|
| F | 50,005 |
| $NH_4$ | 11,847 |
| Al | 17,613 |
| $H_2O$ | 3,834 |

This product is fed through the line 125 to the sublimer 126 wherein it is sublimed at a temperature of 900–950° F. The finished product is removed from the sublimer through the line 130 and amounts to 51,000 pounds per day analyzing as follows:

| | Weight percent |
|---|---|
| F | 62.1 |
| Al | 29.5 |
| $Al_2O_3$ | 5.4 |
| $H_2O$ | 3.0 |

The ammonium bifluoride solution in the line 118 is produced as follows:

(a) The sublimate from the sublimer contains 12,450 pounds of fluorine, 11,200 pounds of ammonia and 3,800 pounds of water. The ammonia is combined with the fluorine as ammonium fluoride, but some of this may be decomposed into HF and free ammonia due to the elevated temperature of the sublimer. This sublimate is fed through the line 131 and is combined with the volatiles from the drier 124, these volatiles being taken off through the line 133 and comprising 4,776 pounds per day of F, 4,523 pounds per day of $NH_4$ and 9,299 pounds per day of $H_2O$. These combined materials are fed through the line 134 to the line 118.

(b) The filtrate from the filter 121 comprises:

| | Pounds per day |
|---|---|
| F | 18,891 |
| $NH_4$ | 8,445 |
| $SO_4$ | 32,836 |
| Al | 854 |
| H | 1,156 |
| $H_2O$ | 588,693 | and is fed through the line 136 to a stripper 137 wherein it is boiled to remove the fluorine values, these volatiles being taken off through the line 138 and comprising 19,618 pounds per day of HF and 48,086 pounds per day of $H_2O$. This material is combined with the material in the line 140 (described below) and fed through the line 141 to the line 118.

(c) Make-up ammonium bifluoride is produced by neutralizing fluosilicic acid (10,640 pounds per day of $H_2SiF_6$ and 78,026 pounds per day of $H_2O$), which is fed to a neutralizer 150, with ammonia (7,537 pounds per day of $NH_3$) from the lines 151 and 152. The reaction product is filtered on a filter 153 to separate therefrom 3,700 pounds per day of $SiO_2$ and 37,000 pounds per day of $H_2O$. The filtrate in line 140 comprises 8,418 pounds per day of F, 8,424 pounds per day of NH and 16,207 pounds per day of $H_2O$.

The aluminum sulfate fed into the digester 111 through the line 111a is produced as follows:

The solution from the stripper 137, comprising:

| | Pounds per day |
|---|---|
| $NH_4$ | 8,445 |
| $SO_4$ | 32,836 |
| Al | 854 |
| $H_2O$ | 540,877 | is fed through the line 160 to a crystallizer 171 wherein the ammonium sulfate (44,326 pounds per day) is crystallized with the removal through the line 172 of 540,877 pounds per day of water. The ammonium sulfate is sent through line 173 to a kiln 175 wherein it is heated to about 550° F., 5,709 pounds per day of $NH_3$ being driven off through line 176 and a portion sent to line 152, the remainder being recycled to the crystallizer through the line 177. The product from the kiln 175 (38,426 pounds per day of $NH_4HSO_4$) is dissolved in a dissolver 180 with 2,940 pounds per day of $H_2SO_4$ and 12,567 pounds per day of $Al_2O_3$ to produce the desired aluminum sulfate which is fed to the digester through the line 111a. Line 181 feeds 3780 pounds per day of $NH_3$ from the dissolver to lines 152 and 177.

EXAMPLE 9

400 pounds of commercial aluminum sulfate containing 17.21% aluminum were dissolved in 108 gallons of water to which 10.0 pounds of sulfuric acid had been added. The mixture was heated to 170° F. and 100 pounds of 98.6% fluorspar were added. Mechanical agitation together with steam and air agitation were applied for twelve hours and the mixture was then filtered on a vacuum pan filter and the gypsum cake washed countercurrently with hot water. The countercurrent wash streams were the results of seven previous runs and were presumed to be at equilibrium for the system. The first wash was combined with the strong filtrate from the digest and the combination weighed 940 pounds with a 4.94% fluorine content. The washed gypsum cake weighed 240 pounds wet and 172.5 pounds dry. The dry cake contained 1.16% fluorine.

A fluorine balanced at this point showed that of the 48 pounds of fluorine in the fluorspar, 46.4 pounds were in the filtrate and 2.0 pounds remained in the gypsum. This is an extraction efficiency of 95.8%.

The filtrate was then polish filtered and mixed with a solution of ammonium fluoride containing 196 pounds of ammonium fluoride and 200 pounds of water. A dense precipitate was formed which, after washing, weighed 377 pounds wet. This precipitate was then dried at about 300° F. to a dry weight of 240 pounds. The dry cake had 57.6% fluorine and the combined filtrates weighed 1,262 pounds with 0.69% fluorine.

A fluorine balance at this point showed a total of 146.4 pounds of fluorine had been put into the system and that 138.4 pounds were in the dry cake with 8.8 pounds in the filtrates. This amounts to a recovery of 94.8% of the fluorine in the dry cake.

The dry cake was then heated at 900° F. in an indirectly heated kiln with a residence time of ninety minutes. The product contained 65.4% fluorine, weighed 112.4 pounds and contained no ammonia. X-ray diffraction established that the product was aluminum fluoride.

The sublimate was recovered by water scrubbing and the liquor which weighed 408 pounds contained 9.13% fluorine and 8.15% ammonia. This is equivalent to 37.2 pounds of fluorine and 32.2 pounds of ammonia. This liquor was used as part of the ammonium fluoride used in the next run.

EXAMPLE 10

100 grams of $Al_2(SO)_4.13.5H_2O$ were dissolved in 250 grams of water and cooled to 60° F. In a separate vessel, 75 grams of ammonium fluoride were dissolved in 150 grams of water and cooled to 60° F. The two solutions were then mixed and the temperature held constant at 60° F. while the mixture was agitated for twenty minutes. A precipitate formed which was then filtered off and washed with 400 grams of water at 60° F. In order to obtain the various pH values shown in the table for this example, sulfuric acid was added to the aluminum sulfate solution. This precipitate comprised an ammonium fluoroaluminate composition which could then be dehydrated and sublimed to produce aluminum fluoride in the manner previously described.

The precipitate was dried at 250° F. for twenty-four hours, weighed and analyzed for fluorine content. The results of this analysis are shown in the table for Example 10 which appears below.

TABLE

| | | | | | |
|---|---|---|---|---|---|
| Grams Fluorine Input | 38.5 | 38.5 | 38.5 | 38.5 | 38.5 |
| pH of Filtrate | 6.6 | 5.2 | 4.8 | 4.3 | 3.4 |
| Percent Fluorine in Dry Cake | 69.1 | 80.7 | 82.6 | 91.4 | 85.5 |

As shown in this table, the percent fluorine in the dry cake approaches a maximum when the pH is approximately 4 and decreases when the pH is substantially higher or lower than 4. When these results are graphed, it is found that minimum fluorine contents for commercial practice of the present invention, i.e., about 80%, correspond to a maximum pH of about 5.5 and a minimum pH of about 3.

It has been found that these pH limits are also applicable to reactions between ammonium fluoride and ammonium alum, aluminum nitrate, aluminum chloride, etc. In each case, if the reactions are carried out at a temperature other than 60° F., the pH limits must be corrected to 60° F.

EXAMPLE 11

In this example, ammonium alum was substituted for the aluminum sulfate of Example 10. 158 grams of ammonium alum were dissolved in 192 grams of water were reacted in the same manner as that described in Example 10. The precipitate produced according to this example was an ammonium fluoroaluminate product which could then be dehydrated and sublimed to produce aluminum fluoride in the manner previously described.

The precipitate was then dried at 250° F. for twenty-four hours, weighed and analyzed for fluorine content. The results of this analysis are shown in the table for Example 11 which appears below.

TABLE

| Grams Fluorine Input | 38.5 | 38.5 | 38.5 | 38.5 |
|---|---|---|---|---|
| pH Filtrate | 6.7 | 4.1 | 3.8 | 3.2 |
| Percent Fluorine in Dry Cake | 79.0 | 82.4 | 89.2 | 89.4 |

FIG. 3 illustrates the embodiment of the present invention in which ammonium alum is used as a reactant in the process of the present invention.

As indicated in FIG. 3, bauxite is stored at 200 and is fed to digester 211 together with ammonium bisulfate and water. The digester 211 is heated with live steam. Aluminum metal is added to reduce the ferric ions present to ferrous ions prior to the crystalization of the alum, thereby reducing the amount of iron contamination in the product. The bauxite and ammonium bisulfate react in digester 211 to produce ammonium alum and ammonium sulfate which are fed to filter 212 which preferably comprises a pressure leaf filter using a filter aid. The filtrate from filter 212 is then fed to crystalizer 213 wherein the ammonium alum is crystalized and then dewatered in a conventional screen 214. The mother liquor from crystalizer 213 is transferred from screen 214 to preheater 222. The alum crystals from crystalizer 213 are then fed to reactor 215 which is also supplied with ammonium fluoride solution. The ammonium fluoroaluminate precipitate, which has prevously been described, is formed in reactor 215. This precipitate is then washed in a counter-current wash system 216 with fresh water being fed to the last of a series of decantation washers. The washed fluoroaluminate precipitate is then fed to plug mill 217 where it is combined with some of the recycled product from dryer 218. The discharge solids from plug mill 217 are fed to dryer 218 which is preferably a rotary dryer wherein dehydration is performed at a temperature below about 300° F. A portion of this dehydrated fluoroaluminate is fed to sublimer 219 while the remainder is recycled to pug mill 217. The sublimer 219 is operated at a temperature in the range of from about 500° F. to about 1200° F. and, in the manner previously described, converts the fluoroaluminate to aluminum fluoride. This aluminum fluoride is then collected as the product.

The sublimate from sublimer 219 which substantially comprises ammonium fluoride is fed to scrubber 220 where it is scrubbed with fresh water to form an ammonium fluoride solution. This ammonium fluoride solution is passed through heat exchanger 221 which is provided with a cooling medium such as cold water and then fed to reactor 215.

The ammonium sulfate solution obtained by washing the fluoroaluminate precipitate in washer 216 is combined with the ammonium sulfate solution from screen 214 and the ammonium sulfate solution from filter 313 and fed to preheater 222 and then to crystalizer 223 wherein ammonium sulfate is crystalized. The ammonium sulfate crystals are then fed to reactor 224 wherein they are heated to an elevated temperature to produce ammonium bisulfate, a portion of which is fed to digester 211.

The additional fluorine which is required in this process is obtained from fluorspar which is stored at 300. The fluorspar from 300 is combined with a portion of the ammonium bisulfate from reactor 224 in reactor 311 which is also heated. The fluorspar and ammonium bisulfate react to produce calcium sulfate and hydrogen fluoride gas. The calcium sulfate from reactor 311 is fed to reactor 312 where it is combined with ammonium carbonate solution to react to form calcium carbonate and ammonium sulfate solution. The calcium carbonate is separated in filter 313 and discarded and the ammonium sulfate is fed to preheater 222.

The hydrogen fluoride gas produced in reactor 311, which gas also contains silica, is combined with an ammoniacal solution in scrubber 314 to form ammonium fluoride and precipitate silica. Preferably, scrubber 314 is operated at a pH of about 8.8. This ammonium fluoride is then passed through filter 315 and ammonia stripper 316. The silica removed in filter 315 is discarded. After the ammonia has been stripped, the ammonium fluoride from stripper 316 is fed to reactor 215. The ammonia from ammonia stripper 316 is fed to ammonia absorber 317 which is also supplied water. A part of the ammoniacal solution from absorber 317 is fed to carbon dioxide absorber 318 which is supplied with carbon dioxide. The balance of the ammoniacal solution is fed to scrubber 314. The carbon dioxide reacts with the ammoniacal solution in absorber 318 to form ammonium carbonate. This ammonium carbonate is fed from absorber 318 to reactor 312.

A distinct advantage of this process is that it is not necessary to use acid grade fluorspar; rather, low-grade fluorspar may be used because the silica may be removed by controlling the alkalinity of the ammonia scrubbing system. By maintaining a pH of about 8.8 in scrubber 314, all of the silica in the gas stream from reactor 311 may be removed in scrubber 314 and filter 315 and a silica-free ammonia fluoride solution sent to reactor 215.

The following examples indicate the reduction in the amount of monoammoniumfluoroaluminate produced as the fluorine to aluminum ratio is increased above 4.6:1.

EXAMPLE 15

A solution was prepared by dissolving 737.0 grams of ammonium alum in 500 ml. hot water. To this solution was added a 665 gram solution containing 195.5 grams of fluorine and 77.3 grams of ammonia. The resultant slurry was allowed to cool and then the strong filtrate was separated by vacuum filtration and the cake washed with 400 ml. cold water. The cake was dried and analyzed chemically and by X-ray diffraction. The following data were obtained:
  (a) Dry cake:
    Weight—230.0 grams
    X-ray diffraction—25% monoammoniumfluoroaluminate
    Fluorine—59.7%
    Ammonia—22.9%
    Aluminum—16.0%
  (b) Strong filtrate:
    Weight—1243.0 grams
    Fluorine—3.7%
    Ammonia—4.9%
  (c) Wash water:
    Weight—446.1 grams
    Fluorine—1.6%
    Ammonia—1.6%

Fluorine to aluminum ratio in initial reactant—5.36:1.00.
Fluorine to aluminum in cake—5.32:1.00.

Material balances are as follows:
(a) Fluorine:
195.5 grams fluorine in
137.0 grams fluorine in dry cake
46.2 grams fluorine in strong filtrate
7.2 grams fluorine in wash water
190.4 grams fluorine accounted for or 97.5%.
(b) Ammonia:
129.3 grams ammonia in
55.0 grams ammonia in dry cake
60.9 grams ammonia in strong filtrate
7.1 grams ammonia in wash water
123.0 grams ammonia accounted for or 95.0%.
(c) Aluminum:
42.5 grams aluminum in
36.8 grams aluminum in dry cake or 86.5%.

EXAMPLE 16

A solution was prepared which contained 90.5 grams of fluorine and 76.5 grams of ammonia together with 326.9 grams of water. To this solution, 383.0 grams of ammonium alum were added over a 10 minute period. The resultant slurry was allowed to stand and then was filtered by vacuum filtration and washed with 300 ml. cold water. The cake was dried and analyzed chemically and by X-ray diffraction. The following data were obtained:

(a) Dry cake:
Weight—139.3 grams
X-ray diffraction—20% monoammoniumfluoroaluminate
Fluorine—56.1%
Ammonia—22.4%
Aluminum—16.7%
(b) Strong filtrate:
Weight—635.9 grams
Fluorine—1.43%
Ammonia—6.9%
(c) Wash water:
Weight—323.5 grams
Fluorine—0.38%
Ammonia—4.0%
Fluorine to aluminum ratio in initial reactant—5.25:1.00.

Material balances are as follows:
(a) Fluorine:
90.0 grams fluorine in
78.0 grams fluorine in dry cake
9.1 grams fluorine in strong filtrate
1.0 gram fluorine in wash water
88.1 grams fluorine accounted for or 97.8%.
(b) Ammonia:
90.9 grams ammonia in
31.3 grams ammonia in dry cake
44.6 grams ammonia in strong filtrate
12.7 grams ammonia in wash water
88.6 grams ammonia accounted for or 97.4%.
(c) Aluminum:
24.0 grams aluminum in
23.2 grams aluminum in dry cake or 96.6%.

EXAMPLE 17

A solution was prepared containing 38.5 grams of fluorine and 34.3 grams of ammonia together with 150 grams of water. A second solution was prepared containing 100 grams of $Al_2(SO_4)_3 \cdot 13H_2O$ in 250 grams of water. The resultant slurry was separated by vacuum filtration and washed with cold water. The strong and weak filtrates were collected as a single filtrate. The cake was dried and analyzed chemically and by X-ray diffraction. The following data were obtained:

(a) Dry cake:
Weight—54.2 grams
X-ray diffraction—trace of monoammoniumfluoroaluminate, substantially all triammoniumfluoroaluminate
Fluorine—57.9%
Ammonia—26.0%
Aluminum—15.6%
(b) Filtrate:
Weight—865.7 grams
Fluorine—6.5%
Ammonia—2.78%
Fluorine to aluminum ratio in initial reactants—6.00:1.00.

Material balances are as follows:
(a) Fluorine:
38.5 grams fluorine in
31.4 grams fluorine in dry cake
6.5 grams fluorine in filtrate
37.9 grams fluorine accounted for or 98.3%.
(b) Ammonia:
34.3 grams ammonia in
14.1 grams ammonia in dry cake
23.9 grams ammonia in filtrate
38.5 grams ammonia accounted for or 98.4%.
(c) Aluminum:
9.4 grams aluminum in
8.5 grams aluminum in dry cake or 90%.

EXAMPLE 18

A solution containing ammonia and fluorine was prepared which had 93.4 grams of fluorine and 76.5 grams of ammonia in solution. The amount of water was 343.1 grams. To this solution was added 417.0 grams of an ammonia alum which contained 12.79% $Al_2O_3$. The solid material was stirred in over a period of 8 minutes. The slurry was allowed to settle and then was filtered off and washed with 400 ml. of cold water. The cake was dried and analyzed chemically and by X-ray diffraction. The following data was obtained:

(a) Dry cake:
Weight—144.5 grams
Monoammoniumfluoroaluminate—30%
Fluorine—59.1%
Ammonia—24.4%
Aluminum—15.4%.
(b) Strong filtrate:

Weight—76.7 grams
Fluorine—3.1%
Ammonia—7.0%.
(c) Wash water:
Weight—437.0 grams
Fluorine—0.9%
Ammonia—1.1%.
Atomic fluorine to aluminum ratio in initial reactants—4.65:1.00.

Material balances are as follows:
(a) Fluorine:
93.4 grams fluorine in
85.5 grams fluorine in dry cake
0.44 gram fluorine in strong filtrate
0.2 gram fluorine in wash water
89.5 grams fluorine accounted for or 95.8%.
(b) Ammonia:
93.1 grams ammonia in
35.2 grams ammonia in dry cake
49.6 grams ammonia in strong filtrate
4.4 grams ammonia in wash liquor
89.2 grams ammonia accounted for or 96.8%.
(c) Aluminum:
28.3 grams aluminum in
22.4 grams aluminum in dry cake
78.3% accounted for.

EXAMPLE 19

A solution containing fluorine and ammonia was prepared which had 88.1 grams of fluorine and 76.5 grams of ammonia together with 331.6 grams of water. To this was added 393.0 grams of ammonium alum containing 12.79% alumina. The solid alum was stirred in over a period of 11 minutes. The slurry was allowed to settle, was filtered off by vacuum filtration and washed with 400 ml. of cold water. The strong filtrate was separated from the wash liquors. The washed cake was dried and analyzed chemically and by X-ray diffraction. The following data were obtained:

(a) Dry cake:
Weight—139.6 grams
X-ray diffraction—25% monoammoniumfluoroaluminate
Fluorine—58.9%
Ammonia—24.3%
Aluminum—16.5%.
(b) Strong filtrate:
Weight—659.0 grams
Fluorine—0.50%
Ammonia—7.1%.
(c) Wash water:
Weight—431.6 grams
Fluorine—0.3%
Ammonia—1.9%.

Atomic ratio fluorine to aluminum in initial reactants—4.63.

The following material balances were obtained:

(a) Fluorine:
88.1 grams fluorine in
81.1 grams fluorine in dry cake
3.3 grams fluorine in strong filtrate
1.3 grams fluorine in wash water
85.7 grams fluorine accounted for or 97.2%.
(b) Ammonia:
91.0 grams ammonia in
33.8 grams ammonia in dry cake
46.7 grams ammonia in strong filtrate
8.2 grams ammonia in wash water
88.7 grams ammonia accounted for or 97.3%.
(c) Aluminum:
26.6 grams aluminum in
23.0 grams aluminum in dry cake or 86.4% accounted for.

The following examples illustrate the decrease in yield of monoammoniumfluoroaluminate when the fluorine to aluminum ratio is below 4.5:1.

EXAMPLE 20

A solution containing ammonia and fluorine was prepared which had 194.6 grams of fluorine and 150.0 grams of ammonia in 740 grams of water. To this solution, 980 grams solid ammonium alum containing 12.8% alumina was added over a 10 minute period with constant agitation. After allowing to stand, the slurry was filtered off, then washed with 400 ml. of cold water. The washed cake was dried and subjected to chemicals and X-ray diffraction analysis. The following data were obtained:

(a) Dry cake:
Weight—255.5 grams
X-ray diffraction—80% plus monoammoniumfluoroaluminate
Fluorine—60%
Ammonia—18.8%
(b) Strong filtrate:
Weight—1649.6 grams
Fluorine—1.24%
Ammonia—7.50%
(c) Wash liquor:
Weight—440.7 grams
Fluorine—0.86%
Ammonia—2.4%

Atomic ratio fluorine to aluminum in initial reactants—4.18:1.00.

Material balances are as follows:

(a) Fluorine:
194.6 grams fluorine in
155.0 grams fluorine in dry cake
20.5 grams fluorine in strong filtrate
3.8 grams fluorine in wash water
179.3 grams fluorine accounted for or 92.5%
(b) Ammonia:
185.8 grams ammonia in
48.0 grams ammonia in dry cake
123.4 grams ammonia in strong filtrate
10.7 grams ammonia in wash water
182.1 grams ammonia accounted for or 98.7%.

EXAMPLE 21

A solution containing fluorine and ammonia was prepared which contained 187.5 grams of fluorine in solution together with 143.8 grams ammonia. The water in the solution amounted to 740.0 grams. To this solution 965.0 grams of ammonium alum containing 12.8% alumina were added over a period of 9 minutes with constant agitation. The slurry was allowed to settle, then filtered on a vacuum funnel and wash with 400 ml. of cold water. The cake was then dried and subject to chemicals and X-ray diffraction analysis. The following data were obtained:

(a) Dry cake:
Weight—223.5 grams
X-ray diffraction—80% monoammoniumfluoroaluminate
Fluorine—61.3%
Ammonia—19.6%
(b) Strong filtrate:
Weight—1611.9 grams
Fluorine—1.88%
Ammonia—6.8%
(c) Wash water:
Weight—491.3 grams
Fluorine—0.99%
Ammonia—3.0%

Atomic ratio fluorine to aluminum in initial reactants—4.24:1.

Material balances are as follows:

(a) Fluorine:
187.5 grams of fluorine in
137.0 grams fluorine in dry cake
30.3 grams fluorine in strong filtrate
9.3 grams fluorine in wash liquor
176.6 grams fluorine accounted for or 94.0%.
(b) Ammonia:
185.1 grams ammonia in
43.6 grams ammonia in dry cake
109.6 grams ammonia in strong filtrate
14.5 grams ammonia in wash water
167.7 grams ammonia accounted for or 90.4%.

EXAMPLE 22

3,000 grams of $Al_2(SO_4)_3 \cdot 13H_2O$ were dissolved in 6,000 ml. water and heated to 170° F. when 3,000 grams of $NH_4F \cdot HF$ were added. The precipitate was filtered, washed and heated at 250° F. to a moisture content of less than 3%. The dried precipitate was then first heated to 500° F. and then to 950° F. Wet cake weighed 2265.2 grams.

PHYSICAL DATA ON PRECIPITATE

|  | Percent F | Percent NH₃ | Wt., grams |
|---|---|---|---|
| 250° F | 58.89 | 22.6 | 1,658.7 |
| 500° F | 61.49 | 15.1 | 1,230.0 |
| 950° F | 66.21 | Nil | 800.4 |
| Filtrate | 12.5 | 5.52 | 8,942.0 |

FLUORINE BALANCE

| In | Dry 250° F. Cake | Filtrate | Total | Percent Acctd. for |
|---|---|---|---|---|
| 2,000 | 976.8 | 1,117.7 | 2,094.5 | 104.8 |

AMMONIA BALANCE

| In | Dry 250° F. Cake | Filtrate | Total | Percent Acctd. for |
|---|---|---|---|---|
| 894 | 374.9 | 493.6 | 868.5 | 97.1 |

ALUMINUM BALANCE

| In | 250° F. | 500° F. | 950° F. |
|---|---|---|---|
| 281.3 grms | 285.3 | 276.8 | 270.5 |
| Percent Acctd. for | 101.4 | 98.4 | 96.2 |

EXAMPLE 23

100 grams of $Al_2(SO_4)_3 \cdot 13H_2O$ were dissolved in 700 ml. water and then 100 grams of $NH_4F \cdot HF$ were added. A white precipitate formed and was filtered under vacuum and washed. The wet precipitate weighed 61.1 grams.

The wet precipitate was dried to less than 3% $H_2O$ at 250° F. until constant weight which was 45.6 grams. Analysis showed 58.41% F. and 22.0% $NH_3$. This is $(NH_4)_3AlF_6$.

The dry powder was heated to 500° F. for four hours and the weight dropped to 30.0 grams which analyzed as 60.0% F. and 8.5% $NH_3$. The powder was then heated to 900° F. and final weight was 24.3 grams which contained no ammonia and 64.4% F. This is $AlF_3$.

MATERIAL BALANCE

1. Fluorine:

| In | 250°F Cake | Filtrate | Total Acctd. for |
|---|---|---|---|
| 66.8 grms | 26.6 grms | 42.2 grms | 68.8 grms. or 103% |

2. Ammonia:

| In | 250°F Cake | Filtrate | Total Acctd. for |
|---|---|---|---|
| 29.9 grms | 12.3 grms | 20.1 grms | 32.4 grms. or 108% |

3. Aluminum:

| In | 250° F. | 500° F. | 900° F. |
|---|---|---|---|
| 9.38 | 8.34 | 9.30 | 8.65 |
| Percent Acctd. for | 88.9 | 99.1 | 92.2 |

The fluorine in the filtrate is more than 50% of that contained in the $NH_4F \cdot HF$, indicating that the following reaction takes place:

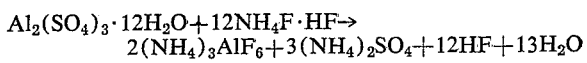

$$Al_2(SO_4)_3 \cdot 12H_2O + 12NH_4F \cdot HF \rightarrow$$
$$2(NH_4)_3AlF_6 + 3(NH_4)_2SO_4 + 12HF + 13H_2O$$

In the above equation 50% of input fluorine remains in the filtrate.

It will be readily apparent to those skilled in the art that the present invention comprises many valuable contributions to the art. Among these contributions are the process comprising the reaction of ammonium fluoride or ammonium bifluoride with aluminum fluosulfate, aluminum fluohydroxide, aluminum sulfate or ammonium alum to produce an ammonium fluoaluminate product which may be dehydrated and sublimed to produce aluminum fluoride. Another contribution made by the present invention is the dehydration procedure disclosed herein. By the use of this procedure, reactions which were previously considered incapable of producing aluminum fluoride, e.g., the reaction between aluminum sulfate, ammonium alum, aluminum chloride, aluminum nitrate, etc., with ammonium fluoride or ammonium bifluoride, may now be used to produce aluminum fluoride. Previously, these reactions were considered capable only of producing cryolites, e.g., $Na_3AlF_6$. Furthermore, as indicated in Example 6, failure to dehydrate may result in hydrolysis of the aluminum fluoride produced in the subliming step with the result that the aluminum fluoride may be decomposed into aluminum oxide and hydrogen fluoride under sublimation conditions.

Furthermore, it is to be understood that the term aluminum fluohydroxide as used in the present specification and claims includes the class of compounds comprising $AlF(OH)_2$ and $AlF_2OH$. Either of these compounds or mixtures thereof may be used in present invention.

Having fully described my invention, it is to be understood that I do not wish to be limited to the details set forth, but my invention is of the full scope of the appended claims.

I claim:

1. A process for the production of aluminum fluoride, comprising the steps of reacting together a compound selected from the group consisting of ammonia bifluoride and ammonium fluoride with an inorganic aluminum salt selected from the group consisting of ammonia bifluoride aluminum nitrate, ammonium alum, aluminum fluosulfate and aluminum fluohydroxide, or reacting ammonium bifluoride with aluminum sulphate, to produce an insoluble mixture comprising ammonium fluoroaluminates, having the general formula $(NH_4)_xAlF_y$, wherein $x$ is an integer of from 1 to 3 and $y$ is an integer of from 4 to 6, separating said mixture from the soluble products of said reaction, dehydrating said mixture at a temperature of less than about 300° F. until the moisture content thereof is reduced to a maximum of about 3% by weight, and thereafter heating said thus dehydrated mixture to a temperature of from about 700° F. to about 1200° F. to sublime the volatiles including ammonium fluoride from said mixture, leaving the aluminum fluoride product.

2. The process of claim 1 wherein said reacting step is carried out at a pH, corrected to 60° F., in the range of from about 3 to about 5.5.

3. The process of claim 2 wherein said aluminum salt is aluminum nitrate.

4. The process of claim 1 wherein said aluminum salt is aluminum chloride.

5. The method of claim 1 wherein the atomic ratio of fluorine to aluminum is at or below about 4.6:1.

6. The method of claim 5 wherein the atomic ratio of fluorine to aluminum is between about 4.5:1 and about 4.6:1.

7. The process of claim 1 wherein the ammonium compound is ammonium bifluoride.

8. The process of claim 1 wherein the ammonium compound is ammonium fluoride.

9. The process of claim 1 wherein the aluminum salt is aluminum chloride.

10. The process of claim 1 wherein the aluminum salt is aluminum nitrate.

11. The process of claim 1 wherein the aluminum salt is aluminum sulfate.

12. The process of claim 1 wherein the aluminum salt is ammonium alum.

13. The process of claim 1 wherein the aluminum salt is aluminum fluosulfate.

14. The process of claim 1 wherein the aluminum salt is aluminum fluohydroxide.

15. The process of claim 1 wherein ammonium bifluoride is reacted with ammonium alum.

16. The process of claim 1 wherein ammonium alum is reacted with ammonium fluoride.

17. The process of claim 1 wherein aluminum chloride is reacted with ammonium fluoride.

References Cited
UNITED STATES PATENTS

| | | | |
|---|---|---|---|
| 2,981,597 | 4/1961 | Tarbutton | 23—88 |
| 2,981,601 | 4/1961 | Kidde | 23—88 |
| 3,006,724 | 10/1961 | Harrell | 23—88 |
| 3,197,276 | 7/1965 | Forrat | 23—88 |

EDWARD STERN, Primary Examiner

U.S. Cl. X.R.

23—119, 122, 123, 153, 167, 193

UNITED STATES PATENT OFFICE
CERTIFICATE OF CORRECTION

PATENT NO. : 3,525,584
DATED : August 25, 1970
INVENTOR(S) : GUSTAVE E. KIDDE

It is certified that error appears in the above-identified patent and that said Letters Patent are hereby corrected as shown below:

In column 2, line 31, "There" should read -- These --; and in line 43, "$(AlF_2)SO_4$" should read -- $(AlF_2)_2SO_4$ -- . In column 3, line 39, "the" should read -- that -- . In column 4, line 39, "moy" should read -- may -- . In column 6, line 51, that portion of the formula reading "$(SO_3)_4$" should read -- $(SO_4)_3$ -- ; and in line 52, after "and" insert -- then -- . In column 7, line 72, "444,425" should read -- 444,485 -- ; and in line 73, "product" should read -- products -- . In column 8, line 68, "HP" should read -- HF -- . IN COLUMN 12, line 54, that portion of the formula reading "$(SO)_4$" should read -- $(SO_4)_3$ -- . In column 13, lines 57 and 59, "plug", each occurrence, should read -- pug -- . In column 20, line 49, the claim reference numeral "1" should read -- 2 -- ; in line 25, "ammonia" should read -- ammonium -- ; and in line 29, "ammonium bifluoride" should read -- aluminum chloride -- .

Signed and Sealed this thirtieth Day of September 1975

[SEAL]

Attest:

RUTH C. MASON
*Attesting Officer*

C. MARSHALL DANN
*Commissioner of Patents and Trademarks*